(12) United States Patent
Lappi et al.

(10) Patent No.: US 12,638,980 B2
(45) Date of Patent: May 26, 2026

(54) MEMORY SYSTEMS, METHODS, AND MEDIA HAVING A DYNAMIC SYSTEM AREA

(71) Applicant: SK hynix NAND Product Solutions Corporation, Rancho Cordova, CA (US)

(72) Inventors: Cory Lappi, Rochester, MN (US); Ning Wu, Folsom, CA (US); Jozsef Dudas, Vancouver (CA)

(73) Assignee: SK hynix NAND Product Solutions Corporation, Rancho Cordova, CA (US)

( * ) Notice: Subject to any disclaimer, the term of this patent is extended or adjusted under 35 U.S.C. 154(b) by 0 days.

(21) Appl. No.: 18/541,221

(22) Filed: Dec. 15, 2023

(65) Prior Publication Data

US 2025/0199691 A1 Jun. 19, 2025

(51) Int. Cl.
*G06F 3/06* (2006.01)

(52) U.S. Cl.
CPC .......... *G06F 3/0616* (2013.01); *G06F 3/0644* (2013.01); *G06F 3/0679* (2013.01)

(58) Field of Classification Search
CPC ..... G06F 3/0616; G06F 3/0644; G06F 3/0679
See application file for complete search history.

(56) References Cited

U.S. PATENT DOCUMENTS

| | | |
|---|---|---|
| 2015/0186072 A1 | 7/2015 | Darragh et al. |
| 2016/0378364 A1* | 12/2016 | Malina .................. G06F 3/0665 |
| | | 711/114 |
| 2017/0168716 A1* | 6/2017 | Shaharabany ........ G06F 3/0679 |
| 2018/0121136 A1 | 5/2018 | Ishiyama |
| 2019/0042462 A1 | 2/2019 | Zhang et al. |
| 2023/0161482 A1 | 5/2023 | Vyas |
| 2023/0334206 A1 | 10/2023 | Muthiah et al. |

OTHER PUBLICATIONS

International Search Report and Written Opinion dated Mar. 19, 2025 in International Patent Application No. PCT/US2024/059129, pp. 1-9.

* cited by examiner

*Primary Examiner* — Hosain T Alam
(74) *Attorney, Agent, or Firm* — Byrne Poh LLP

(57) ABSTRACT

Mechanisms for providing solid-state drives (SSDs) (such as NAND SSDs) with a dynamic system area are provided. In some embodiments, the mechanism includes: determining a memory die from a plurality of individual memory dies on which system-related data is stored in a reserved band from a plurality of bands; determining lifetime information associated with the memory die on which the system-related data is stored in the reserved band; in response to determining that the lifetime information associated with the memory die is greater than a threshold value, determining unused dies from the plurality of individual memory dies on which the reserved band does not contain the system-related data; selecting at least one unused die based on the determined unused dies; and storing the system-related data in the reserved band of the selected unused die.

21 Claims, 4 Drawing Sheets

| | | | | | | | |
|---|---|---|---|---|---|---|---|
| EB0 | 0 | 1 | 2 | 3 | 4 | 5 | 6 | 7 |
| EB1 | 8 | 9 | 10 | 11 | 12 | 13 | 14 | 15 |
| EB2 | 16 | 17 | 18 | 19 | 20 | 21 | 22 | 23 |
| EB3 | 24 | 25 | 26 | 27 | 28 | 29 | 30 | 31 |
| EB4 | 32 | 33 | 34 | 35 | 36 | 37 | 38 | 39 |
| EB5 | 40 | 41 | 42 | 43 | 44 | 45 | 46 | 47 |
| EB6 | 48 | 49 | 50 | 51 | 52 | 53 | 54 | 55 |
| EB7 | 56 | 57 | 58 | 59 | 60 | 61 | 62 | 63 |

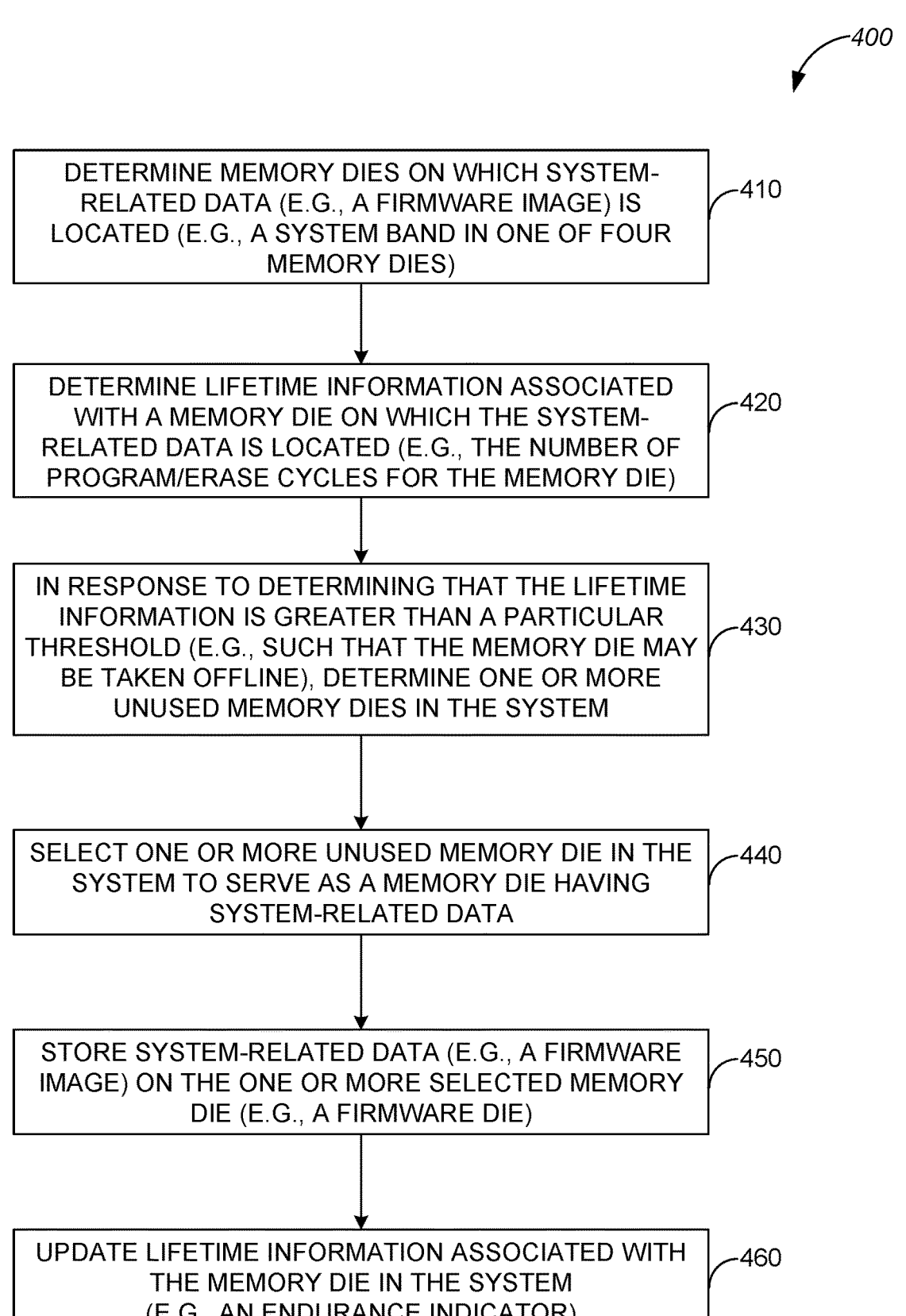

*400*

DETERMINE MEMORY DIES ON WHICH SYSTEM-RELATED DATA (E.G., A FIRMWARE IMAGE) IS LOCATED (E.G., A SYSTEM BAND IN ONE OF FOUR MEMORY DIES) — 410

DETERMINE LIFETIME INFORMATION ASSOCIATED WITH A MEMORY DIE ON WHICH THE SYSTEM-RELATED DATA IS LOCATED (E.G., THE NUMBER OF PROGRAM/ERASE CYCLES FOR THE MEMORY DIE) — 420

IN RESPONSE TO DETERMINING THAT THE LIFETIME INFORMATION IS GREATER THAN A PARTICULAR THRESHOLD (E.G., SUCH THAT THE MEMORY DIE MAY BE TAKEN OFFLINE), DETERMINE ONE OR MORE UNUSED MEMORY DIES IN THE SYSTEM — 430

SELECT ONE OR MORE UNUSED MEMORY DIE IN THE SYSTEM TO SERVE AS A MEMORY DIE HAVING SYSTEM-RELATED DATA — 440

STORE SYSTEM-RELATED DATA (E.G., A FIRMWARE IMAGE) ON THE ONE OR MORE SELECTED MEMORY DIE (E.G., A FIRMWARE DIE) — 450

UPDATE LIFETIME INFORMATION ASSOCIATED WITH THE MEMORY DIE IN THE SYSTEM (E.G., AN ENDURANCE INDICATOR) — 460

FIG. 4

MEMORY SYSTEMS, METHODS, AND MEDIA HAVING A DYNAMIC SYSTEM AREA

BACKGROUND

Solid-state drives (SSDs) are widely used in a variety of computing devices. The number of dies for storing firmware on an SSD is typically limited to a particular number (e.g., four die on the SSD to provide firmware redundancy). SSDs that are used, for example, in qualification and test environments rapidly deplete rated download endurance as each firmware test run can incur at least two program/erase cycles of firmware download wear. This typically results in SSDs needing replacement once their rated download endurance is exceeded. Accordingly, new mechanisms having a dynamic system area are desirable.

SUMMARY

In accordance with some embodiments, mechanisms (which can include systems, methods, and media) having a dynamic system area are provided.

In accordance with some embodiments, a system is provided that includes a memory having a plurality of individual memory dies, where each memory die of the individual memory dies includes a plurality of bands; and at least one hardware processor coupled to the memory and collectively configured to at least: determine a memory die from the plurality of individual memory dies on which system-related data is stored in a reserved band from the plurality of bands; determine lifetime information associated with the memory die on which the system-related data is stored in the reserved band; in response to determining that the lifetime information associated with the memory die is greater than a threshold value, determine unused dies from the plurality of individual memory dies on which the reserved band does not contain the system-related data; select at least one unused die based on the determined unused dies from the plurality of individual memory dies on which the reserved band does not contain the system-related data; and store the system-related data in the reserved band of the selected unused die.

In some embodiments, the lifetime information includes the number of program/erase cycles accrued for the memory die.

In some embodiments, the lifetime information includes defect information associated with the memory die.

In some embodiments, the system-related data includes a firmware image.

In some embodiments, the reserved band is a first band from the plurality of bands in the memory die.

In some embodiments, the hardware processor is further configured to determine that the system-related data includes at least first distinct system-related data and second distinct system-related data, where first lifetime information is associated with a first memory die from the plurality of individual memory dies on which the first distinct system-related data is stored and second lifetime information is associated with a second memory die from the plurality of individual memory dies on which the second distinct system-related data is stored.

In some embodiments, the hardware processor is further configured to share the unused die from the plurality of individual memory die between at least the first distinct system-related data and the second distinct system-related data by determining at least a first unused die from the plurality of individual memory dies on which the reserved band does not contain at least the first distinct system-related data in response to determining that the first lifetime information is greater than the threshold value at a first time and determining at least a second unused die from the plurality of individual memory dies on which the reserved band does not contain at least the second distinct system-related data in response to determining that the second lifetime information is greater than the threshold value at a second time.

In accordance with some embodiments, a method implemented on a memory device having a plurality of individual memory dies is provided is provided, where each memory die of the individual memory dies includes a plurality of bands, and where the method includes: determining a memory die from the plurality of individual memory dies on which system-related data is stored in a reserved band from the plurality of bands; determining lifetime information associated with the memory die on which the system-related data is stored in the reserved band; in response to determining that the lifetime information associated with the memory die is greater than a threshold value, determining unused dies from the plurality of individual memory dies on which the reserved band does not contain the system-related data; selecting at least one unused die based on the determined unused dies from the plurality of individual memory dies on which the reserved band does not contain the system-related data; and storing the system-related data in the reserved band of the selected unused die.

In accordance with some embodiments, a non-transitory computer-readable medium containing computer executable instructions that, when executed by a processor, cause the processor to perform a method implemented on a memory device having a plurality of individual memory dies, wherein each memory die of the individual memory dies includes a plurality of bands, is provided, the method comprising: determining a memory die from the plurality of individual memory dies on which system-related data is stored in a reserved band from the plurality of bands; determining lifetime information associated with the memory die on which the system-related data is stored in the reserved band; in response to determining that the lifetime information associated with the memory die is greater than a threshold value, determining unused dies from the plurality of individual memory dies on which the reserved band does not contain the system-related data; selecting at least one unused die based on the determined unused dies from the plurality of individual memory dies on which the reserved band does not contain the system-related data; and storing the system-related data in the reserved band of the selected unused die.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3 is a blog diagram of an illustrative example of a memory die including multiple bands and multiple blocks in accordance with some embodiments of the disclosed subject matter.

FIG. 4 is an illustrative example of a process for providing a dynamic system area in accordance with some embodiments of the disclosed subject matter.

DETAILED DESCRIPTION

Figure 1:
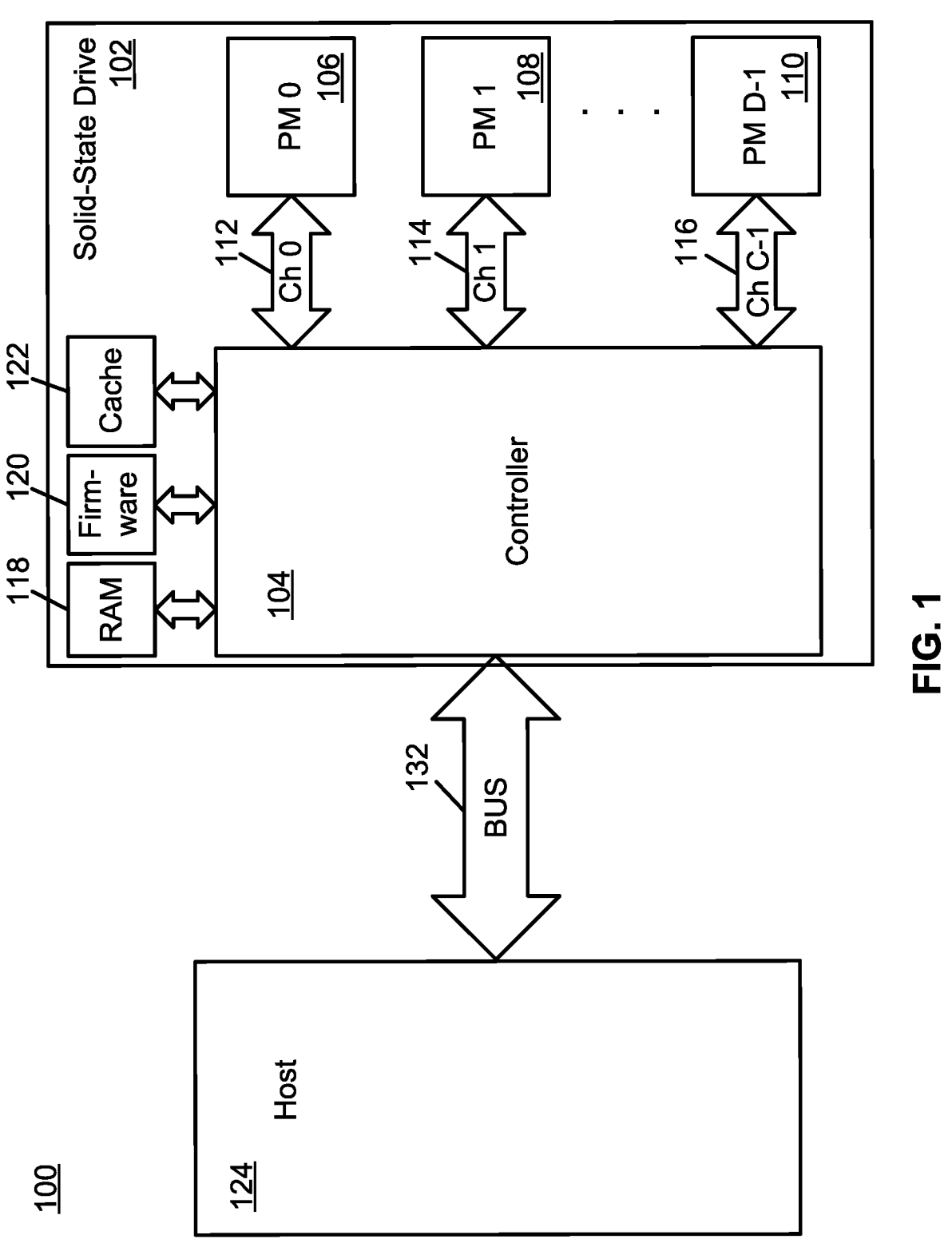
FIG. 1 is a block diagram of an illustrative example of a solid-state drive coupled to a host device via a bus in accordance with some embodiments of the disclosed subject matter.

In accordance with some embodiments, mechanisms (which can include systems, methods, and media) for providing solid-state drives (SSDs) (such as NAND SSDs) with a dynamic system area are provided.

In some embodiments, in order to provide a dynamic system area, the mechanisms can identify one or more blocks of physical media (e.g., the first block in the first band) for creating a dynamic system area. For example, the mechanisms can determine that a reserved band having a particular number of blocks within each die are to be allocated for system-related data, where system-related data can include firmware images, system metadata, mapping information, context information, and/or any other suitable system-related data. In another example, the mechanisms can determine that the first block or blocks in the first band of each die are to be allocated for system-related data.

In some embodiments, the mechanisms can determine where the system-related data is currently stored. For example, the mechanisms can determine that system-related data, such as a firmware image, is stored in a first block of a first band of multiple dies (e.g., block "0" of the EB0 band in four different dies). In continuing this example, the mechanisms can determine lifetime information associated with a memory die on which the system-related data is stored. Lifetime information can include, for example, a count of the number of program/erase cycles accrued for the memory die, the number of defects, wear or degradation characteristics, a die endurance indicator, and/or any other suitable die endurance information.

In response to determining that the lifetime information is greater than a particular threshold value (e.g., within 10% of the remaining estimated lifespan of a memory die in terms of program/erase cycles), the mechanisms can determine whether the solid-state drive includes one or more unused memory dies in which the system-related data has not been stored in the reserved band. In turn, one or more unused dies can be selected and the system-related data can be stored in the reserved band of the selected unused die or dies.

It should also be noted that the mechanisms described herein can be applied to any suitable independently managed system areas. In some embodiments, the mechanisms can determine that distinct system-related data has been stored on different blocks, different bands, and/or different die. For example, the mechanisms can determine that first system-related data, such as a firmware image, is stored in a first set of blocks of a reserved system band in each of four particular dies and that second system-related data, such as system context information, is stored in a first set of blocks of the reserved system band in each of four other dies. The mechanisms can independently manage the storage of each distinct system area on the solid-state drive. For example, the mechanisms can share the unused die on the solid-state drive between the distinct system areas.

This dynamic system area provided by the mechanisms described herein can dynamically adjust system area usage within a solid-state drive based on lifetime information (e.g., the number of program/erase cycles accrued for a given die, the number of defects encountered for a given die, an endurance indicator for a given die, etc.). By expanding the system area to multiple dies in the solid-state drive, the mechanisms can adapt to failing dies that contain system-related data, thereby increasing download endurance of the solid-state drive. Such mechanisms can also reduce the failure rate for solid-state drives that are used in download test environments. Even further, by creating a dynamic system area, the mechanisms can improve the reliability of the system-related data in the solid-state drive.

These and other features for providing a dynamic system area are further described in connection with FIGS. 1-4.

Turning to FIG. 1, a block diagram of an illustrative example of a solid-state drive 102 coupled to a host device 124 via a bus 132 that can be used to implement the mechanisms described herein in accordance with some embodiments is illustrated.

As shown, solid-state drive 102 can include a controller 104, physical media 106, 108, and 110, channels 112, 114, and 116, random access memory (RAM) 118, firmware 120, and cache 122 in some embodiments. In some embodiments, more or fewer components than shown in FIG. 1 can be included. In some embodiments, two or more components shown in FIG. 1 can be included in one component.

Controller 104 can be any suitable controller for a solid-state drive in some embodiments. In some embodiments, controller 104 can include any suitable hardware processor(s) (such as a microprocessor, a digital signal processor, a microcontroller, a programmable gate array, etc.). In some embodiments, controller 104 can also include any suitable memory (such as RAM, firmware, cache, buffers, latches, etc.), interface controller(s), interface logic, drivers, etc.

Physical media 106, 108, and 110 can be any suitable physical media for storing information (which can include data, programs, and/or any other suitable information that can be stored in a solid-state drive) in some embodiments. The physical media can include any suitable memory cells, hardware processor(s) (such as a microprocessor, a digital signal processor, a microcontroller, a programmable gate array, etc.), interface controller(s), interface logic, drivers, etc. in some embodiments. While three physical media (106, 108, and 110) are shown in FIG. 1, any suitable number D of physical media (including only one) can be used in some embodiments. Any suitable type of physical media can be used in some embodiments. For example, in some embodiments, the physical media can be implemented using NAND flash memory, NOR flash memory, and/or any other suitable flash technology, phase change memory technology, and/or other any other suitable non-volatile memory storage technology. When using NAND flash memory, any suitable NAND technology can be used in some embodiments. For example, in some embodiments, NAND technologies such as single-level cell (SLC) NAND, multilevel cell (MLC) NAND, triple-level cell (TLC) NAND, quad-level cell (QLC) NAND, penta-level cell (PLC) NAND, or any NAND with suitable levels of cells. In some embodiments, the NAND can be 2D NAND or 3D NAND. Each physical media can have any suitable size in some embodiments.

It should be noted that each of the physical media 106, 108, and 110 can include one or more memory dies, where controller 104 can be configured to identify one or more blocks of the physical media 106, 108, and/or 110 (e.g., including the first block) for creating a dynamic system area, determine which memory dies on which system-related data (such as firmware) is stored in a particular band (e.g., the EB0 band) on the memory die, determine lifetime information associated with the memory die (e.g., the number of program/erase cycles), determine unused dies from the physical media 106, 108, and 110 on which the particular band does not contain the system-related data, select at least one of the unused dies for storing the system-related data, and storing the system-related data in the particular band of the selected unused die.

Channels 112, 114, and 116 can be any suitable mechanism for communicating information between controller 104 and physical media 106, 108, and 110 in some embodiments. For example, the channels can be implemented using conductors (lands) on a circuit board in some embodiments. While three channels (112, 114, and 116) are shown in FIG. 1, any suitable number C of channels can be used in some embodiments.

Random access memory (RAM) 118 can include any suitable type of RAM, such as dynamic RAM, static RAM, etc., in some embodiments. Any suitable number of RAM 118 can be included, and each RAM 118 can have any suitable size, in some embodiments.

Firmware 120 can include any suitable combination of software and hardware in some embodiments. For example, firmware 120 can include software programmed in any suitable programmable read only memory (PROM) in some embodiments. Any suitable number of firmware 120, each having any suitable size, can be used in some embodiments.

Cache 122 can be any suitable device for temporarily storing information (which can include data and programs in some embodiments), in some embodiments. Cache 122 can be implemented using any suitable type of device, such as RAM (e.g., static RAM, dynamic RAM, etc.) in some embodiments. Any suitable number of cache 122, each having any suitable size, can be used in some embodiments.

Host device 124 can be any suitable device that accesses stored information in some embodiments. For example, in some embodiments, host device 124 can be a general-purpose computer, a special-purpose computer, a desktop computer, a laptop computer, a tablet computer, a server, a database, a router, a gateway, a switch, a mobile phone, a communication device, an entertainment system (e.g., an automobile entertainment system, a television, a set-top box, a music player, etc.), a navigation system, etc. While only one host device 124 is shown in FIG. 1, any suitable number of host devices can be included in some embodiments.

Bus 132 can be any suitable bus for communicating information (which can include data and/or programs in some embodiments), in some embodiments. For example, in some embodiments, bus 132 can be a PCIE bus, a SATA bus, or any other suitable bus.

Figure 2:
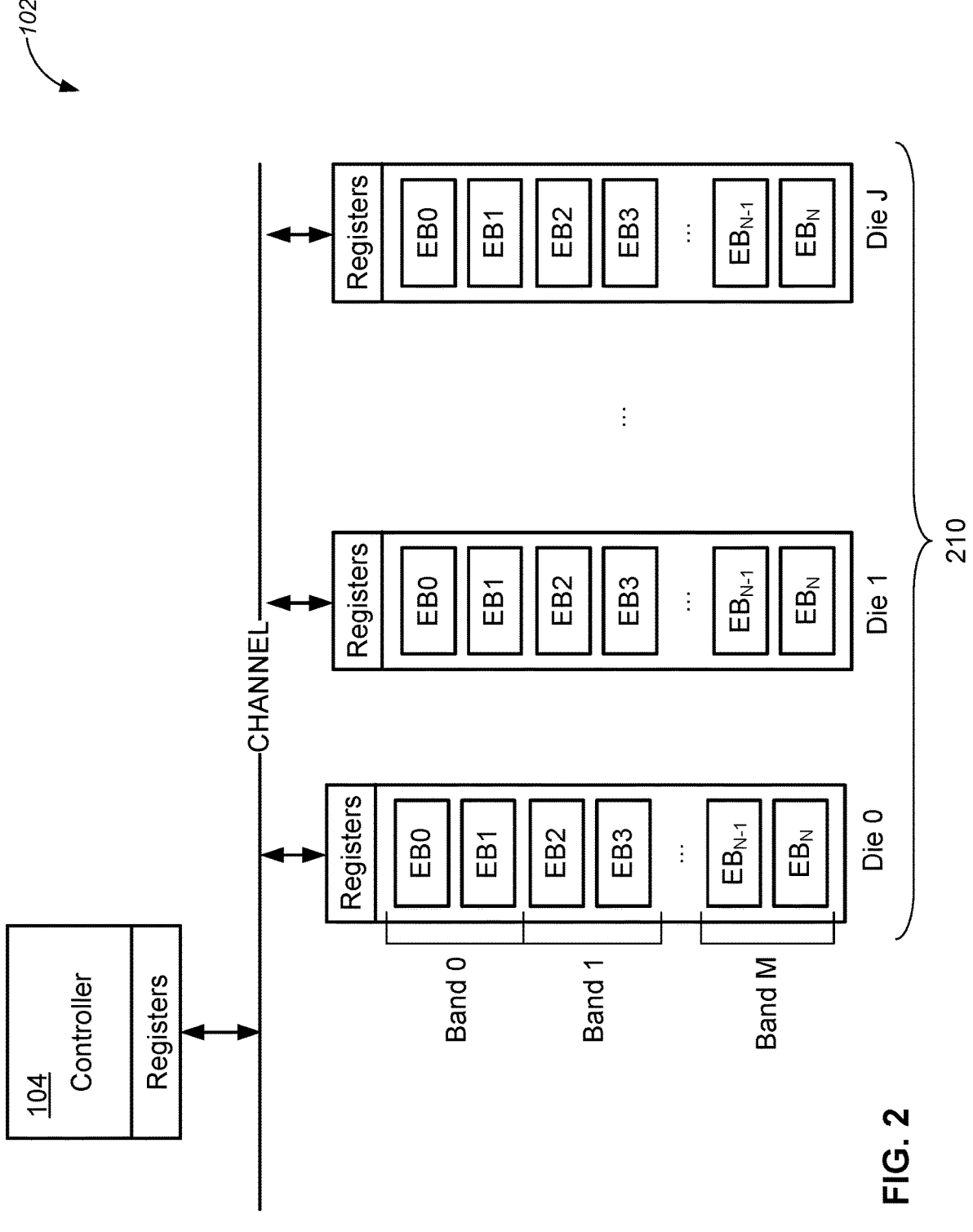
FIG. 2 is a block diagram of an illustrative example of a solid-state drive including multiple dies in accordance with some embodiments of the disclosed subject matter.

Turning to FIG. 2, an illustrative example of a solid-state drive including multiple dies is shown in accordance with some embodiments of the disclosed subject matter. As shown, solid-state drive 102 can include a controller 104 coupled through a channel to one or more memory die 210. Controller 104 can include multiple register configurations, and each of the memory dies 210 can include associated registers. In some embodiments, memory die 210 can include Die 0 through Die J (where J is greater than 1). Each Die 0 though Die J in memory die 210 can include erase blocks (EBs) EB0 through EBN (where N is greater than 1). The erase blocks can be organized in any suitable number of bands from band 0 through band M (where M is greater than 1). For example, a band may refer to a set of equal logically numbered NAND erase bands which span across all NAND die in a given NAND array. The components of solid-state drive 102 can cooperate (e.g., through suitable firmware (FW)) to provide a dynamic system area. For example, firmware code may identify an individual erase band, groups of erase bands, other systems of the NAND array (e.g., including bands), or an individual NAND die to be used for providing a dynamic system area (e.g., in response to a determination that system-related data should be stored in a particular band of an unused NAND die).

It should be noted that solid-state drive 102 can store information, such as system-related data, in physical blocks contained in the solid-state drive 102. A physical block can be a minimum sized unit that can be written in the solid-state drive 102. A physical block can be fixed in size (e.g., 2048 bytes). Physical blocks can be organized into erase blocks (EBs), where an erase block can include one or more physical blocks.

It should also be noted that an erase block can be a type of block that is associated with a group of one or more physical blocks that can be erased as a group. For example, in the instance in which solid-state drive 102 includes sixty-four physical blocks which are divided into eight erase brands, where each erase band includes eight different physical blocks. Erasing an erase band can cause all eight physical blocks associated with the erase band to be erased.

FIG. 3 illustrates an example layout of solid-state drive 102. As shown in FIG. 3, solid-state drive 102 can include a die 310. Die 310 can contain one or more erase blocks (EBs), where an erase block can contain one or more physical blocks 320. In some embodiments, the physical blocks can also be referred to as physical pages. In the example layout illustrated in FIG. 3, die 310 includes eight erase bands (labeled "EB0" through "EB7") and sixty-four physical blocks (numbered block "0" through block "63"). Further, an erase band 330 includes eight physical blocks. Thus, for example, erase band 332 includes eight physical blocks numbers block "0" through block "7" and erase band 334 includes eight physical blocks numbered block "56" through block "63."

It should be noted that the layout illustrated in FIG. 3 is an example layout of an embodiment of solid-state drive 102. Other embodiments of solid-state drive 102 can include other layouts. For example, other embodiments of solid-state drive 102 can include more dies, more erase blocks, and/or physical blocks, or fewer erase blocks and/or physical blocks than what is illustrated in FIG. 3.

Turning to FIG. 4, an illustrative example of a process 400 for providing a dynamic system area in accordance with some embodiments of the disclosed subject matter is shown. In some embodiments, the process 200 can be modified by, for example, having steps rearranged, changed, added, and/or removed.

It should be noted that process 400 can be executed at any suitable time. For example, process 400 can be executed on solid-state drive 102 prior to each program/erase cycle. In another example, process 400 can be executed on solid-state drive 102 in response to receiving a firmware update request from host 124. In yet another example, process 400 can be executed in response to performing a diagnostic scan of solid-state drive 102 using an application executing on host 124. In a further example, process 400 can be executed on solid-state drive 102 at predetermined intervals (e.g., once every program-erase cycle, once every hour, once every day, etc.).

As illustrative, process 400 begins at 410 by determining one or more memory die on which system-related data is located. System-related data can include, for example, firmware, system metadata, mapping information, and/or any other suitable system-related data. For example, process 400 can determine, at 410, that system-related data, such as a firmware image, is stored in a first block of a first band (e.g., block "0" of the EB0 band as shown in FIG. 3). In another example, process 400 can determine, at 410, that system-related data is stored in a first block of a first band in each of four dies (e.g., block "0" of the EB0 band in die 0, die 1, die 2, and die 3).

It should be noted that, although the examples described herein store the system-related data in one or more blocks of the EB0 band in a memory die, this is merely illustrative. Any suitable high reliability band of a memory die can be used to store the system-related data. For example, the solid-state drive can reserve at least the first band having a particular number of blocks on a memory die for system-related information.

It should also be noted that the mechanisms described herein can be applied to any suitable independently managed system areas. In some embodiments, process 400 can determine that distinct system-related data has been stored on different blocks, different bands, and/or different dies. For example, process 400 can determine that first system-related data, such as a firmware image, is stored in a first block of a first band in each of four dies (e.g., block "0" of the EB0 band in die 0, die 1, die 2, and die 3) and that second system-related data, such as mapping information, is stored in a first block of a first band in each of four other dies (e.g., block "0" of the EB0 band in die 4, die 5, die 6, and die 7). As described herein, process 400 can be implemented on solid-state drive 102 to independently manage the storage of each distinct system area on solid-state drive 102.

Referring back to FIG. 4, in some embodiments, process 400 can, at 420, determine lifetime information associated with a memory die on which the system-related data is located. Lifetime information can include, for example, a count of the number of program/erase cycles accrued for the memory die, the number of defects, wear or degradation characteristics, a die endurance indicator, and/or any other suitable die endurance information. It should be noted that, for independently managed system areas having distinct types of system data, each die on which system-related data is stored can have different lifetime information.

In some embodiments, process 400 can receive lifetime information from an application executing on a host (e.g., host 124 via bus 132). For example, referring back to FIG. 1, controller 104 can communicate with host 124 to send and receive commands and/or status as well as data. Host 124 executes one or more of an operating system, a driver, and an application. Communication by host 124 with the controller 104 of solid-state drive 102 is optionally and/or selectively via the driver and/or via the application. In one example, communication to controller 104 of solid-state drive 102 is via the driver, and the application provides higher-level commands to the driver that the driver translates into specific commands for controller 104 of solid-state drive 102. In another example, the application can send specific commands to controller 104 of solid-state drive 102. In continuing this example, process 400 can request and receive, from an application executing on a host, lifetime information associated with a particular die on which system-related data (e.g., a firmware image) is located, such as estimated life remaining for a particular die (e.g., 10% remaining life in terms of program/erase cycles).

In some embodiments, process 400 can, at 430, determine whether the solid-state drive includes one or more unused memory dies in response to determining that the lifetime information is greater than a particular threshold value. For example, in response to determining that the number of program/erase cycles is greater than a threshold value (e.g., within 10% of the remaining estimated lifespan of a memory die in terms of program/erase cycles), process 400 can, at 430, determine whether the solid-state drive contains memory dies on which the system-related data has not been stored. In a more particular example, process 400 can perform a search through particular bands (e.g., a static system band, such as the EB0 band) of the multiple memory dies of the solid-state drive to determine whether one or more unused dies can be used for storing system-related data.

In some embodiments, process 400 can, at 440, select at least one of the unused dies based on the determined unused dies that are available for storing system-related data. For example, in response to determining that four dies on the solid-state drive have lifetime information indicating that the four dies are to be taken offline for the purpose of storing system-related data, process 400 can select one or more blocks on four unused dies of the solid-state drive. In another example, in response to determining that a particular number of unused dies are available for the purpose of storing system-related data (e.g., six dies having blocks of the first band available for storing system-related data), in response to determining that multiple distinct system data is used in the solid-state drive (e.g., two independently managed areas of system information), and in response to determining that the lifetime information for the dies associated with each system area is greater than a threshold value or reaching the threshold value (e.g., 10% estimated lifetime for one set of die and 20% estimated lifetime for two set of die), process 400 can determine which unused dies to allocate to the system-related data (e.g., divided evenly between the remaining unused dies, combined and stored in one or more unused dies, etc.).

Process 400 can, at 450, store the system-related data in the reserved band of the selected unused die. For example, process 400 can store a firmware image in the first block of the first band of the selected unused die. In continuing this example, process 400 can remove the firmware image from the memory die that may be taken offline.

In some embodiments, process 400 can update the lifetime information associated with the solid-state drive. For example, process 400 can update the number of unused dies on the solid-state drive on which system-related data has not been stored in one or more system blocks of an unused die. In another example, process 400 can update an endurance indicator associated with a selected unused die on which the system-related information is stored. In a more particular example, an application executing on a host connected to the solid-state drive via a bus can provide user interfaces, such as gas gauges, that indicate die endurance information, number of unused die in the solid-state drive, etc.

It should be noted that, for independently managed system areas having distinct types of system data, process 400 can provide lifetime information associated with each distinct system area, where the unused spare dies on the solid-state drive can be accounted and shared by the system areas when calculating endurance. When a memory die is taken offline, the endurance (which incorporates the availability of unused spare dies) can be decremented for each distinct system area (e.g., a system area that contains a firmware image and a system area that contains system metadata or context information).

Accordingly, mechanisms (which can include systems, methods, and media) having a dynamic system area are provided.

In some embodiments, at least some of the above-described blocks of the process of FIG. 4 can be executed or performed in any order or sequence not limited to the order and sequence shown in and described in connection with the figures. Also, some of the above blocks of the process of FIG. 4 can be executed or performed substantially simultaneously where appropriate or in parallel to reduce latency and processing times in some embodiments. Additionally or alternatively, some of the above described blocks of the process of FIG. 4 can be omitted in some embodiments.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system comprising:
a memory having a plurality of individual memory dies, wherein each memory die of the individual memory dies includes a plurality of bands; and
at least one hardware processor coupled to the memory and collectively configured to at least:
determine a memory die from the plurality of individual memory dies on which system-related data is stored in a reserved band from the plurality of bands;
determine lifetime information associated with the memory die on which the system-related data is stored in the reserved band;
in response to determining that the lifetime information associated with the memory die is greater than a threshold value, search through the plurality of bands on each of the plurality of individual memory dies to determine whether unused dies from the plurality of individual memory dies on which the reserved band does not contain the system-related data are capable of being used for storing system-related data;
select a subset of unused dies from the determined unused dies from the plurality of individual memory dies on which the reserved band does not contain the system-related data based on the number of memory dies having the lifetime information that is greater than the threshold value, wherein the system-related data is allocated between the selected subset of unused dies;
store the system-related data in the reserved band of the selected subset of unused dies and remove the system-related data from the memory dies to be taken offline; and
update the lifetime information associated with the memory, wherein the lifetime information includes an endurance indicator associated with each of the selected subset of unused dies and the memory dies that have been taken offline.

2. The system of claim 1, wherein the lifetime information includes the number of program/erase cycles accrued for the memory die.

3. The system of claim 1, wherein the lifetime information includes defect information associated with the memory die.

4. The system of claim 1, wherein the system-related data includes a firmware image.

5. The system of claim 1, wherein the reserved band is a first band from the plurality of bands in the memory die.

6. The system of claim 1, wherein the hardware processor is further configured to determine that the system-related data includes at least first distinct system-related data and second distinct system-related data, wherein first lifetime information is associated with a first memory die from the plurality of individual memory dies on which the first distinct system-related data is stored and second lifetime information is associated with a second memory die from the plurality of individual memory dies on which the second distinct system-related data is stored.

7. The system of claim 6, wherein the hardware processor is further configured to share the unused die from the plurality of individual memory die between at least the first distinct system-related data and the second distinct system-related data by determining at least a first unused die from the plurality of individual memory dies on which the reserved band does not contain at least the first distinct system-related data in response to determining that the first lifetime information is greater than the threshold value at a first time and determining at least a second unused die from the plurality of individual memory dies on which the reserved band does not contain at least the second distinct system-related data in response to determining that the second lifetime information is greater than the threshold value at a second time.

8. A method implemented on a memory device having a plurality of individual memory dies, wherein each memory die of the individual memory dies includes a plurality of bands, the method comprising:
determining a memory die from the plurality of individual memory dies on which system-related data is stored in a reserved band from the plurality of bands;
determining lifetime information associated with the memory die on which the system-related data is stored in the reserved band;
in response to determining that the lifetime information associated with the memory die is greater than a threshold value, searching through the plurality of bands on each of the plurality of individual memory dies to determine whether unused dies from the plurality of individual memory dies on which the reserved band does not contain the system-related data are capable of being used for storing system-related data;
selecting a subset of unused dies from the determined unused dies from the plurality of individual memory dies on which the reserved band does not contain the system-related data based on the number of memory dies having the lifetime information that is greater than the threshold value, wherein the system-related data is allocated between the selected subset of unused dies;

storing the system-related data in the reserved band of the selected subset of unused dies and removing the system-related data from the memory dies to be taken offline; and updating the lifetime information associated with the memory, wherein the lifetime information includes an endurance indicator associated with each of the selected subset of unused dies and the memory dies that have been taken offline.

9. The method of claim 8, wherein the lifetime information includes the number of program/erase cycles accrued for the memory die.

10. The method of claim 8, wherein the lifetime information includes defect information associated with the memory die.

11. The method of claim 8, wherein the system-related data includes a firmware image.

12. The method of claim 8, wherein the reserved band is a first band from the plurality of bands in the memory die.

13. The method of claim 8, wherein the method further comprises determining that the system-related data includes at least first distinct system-related data and second distinct system-related data, wherein first lifetime information is associated with a first memory die from the plurality of individual memory dies on which the first distinct system-related data is stored and second lifetime information is associated with a second memory die from the plurality of individual memory dies on which the second distinct system-related data is stored.

14. The method of claim 13, wherein the method further comprises sharing the unused die from the plurality of individual memory die between at least the first distinct system-related data and the second distinct system-related data by determining at least a first unused die from the plurality of individual memory dies on which the reserved band does not contain at least the first distinct system-related data in response to determining that the first lifetime information is greater than the threshold value at a first time and determining at least a second unused die from the plurality of individual memory dies on which the reserved band does not contain at least the second distinct system-related data in response to determining that the second lifetime information is greater than the threshold value at a second time.

15. A non-transitory computer-readable medium containing computer executable instructions that, when executed by a processor, cause the processor to perform a method implemented on a memory device having a plurality of individual memory dies, wherein each memory die of the individual memory dies includes a plurality of bands, the method comprising:

determining a memory die from the plurality of individual memory dies on which system-related data is stored in a reserved band from the plurality of bands;

determining lifetime information associated with the memory die on which the system-related data is stored in the reserved band;

in response to determining that the lifetime information associated with the memory die is greater than a threshold value, searching through the plurality of bands on each of the plurality of individual memory dies to determine whether unused dies from the plurality of individual memory dies on which the reserved band does not contain the system-related data are capable of being used for storing system-related data;

selecting a subset of unused dies from the determined unused dies from the plurality of individual memory dies on which the reserved band does not contain the system-related data based on the number of memory dies having the lifetime information that is greater than the threshold value, wherein the system-related data is allocated between the selected subset of unused dies;

storing the system-related data in the reserved band of the selected subset of unused dies and removing the system-related data from the memory dies to be taken offline; and updating the lifetime information associated with the memory, wherein the lifetime information includes an endurance indicator associated with each of the selected subset of unused dies and the memory dies that have been taken offline.

16. The non-transitory computer-readable medium of claim 15, wherein the lifetime information includes the number of program/erase cycles accrued for the memory die.

17. The non-transitory computer-readable medium of claim 15, wherein the lifetime information includes defect information associated with the memory die.

18. The non-transitory computer-readable medium of claim 15, wherein the system-related data includes a firmware image.

19. The non-transitory computer-readable medium of claim 15, wherein the reserved band is a first band from the plurality of bands in the memory die.

20. The non-transitory computer-readable medium of claim 15, wherein the method further comprises determining that the system-related data includes at least first distinct system-related data and second distinct system-related data, wherein first lifetime information is associated with a first memory die from the plurality of individual memory dies on which the first distinct system-related data is stored and second lifetime information is associated with a second memory die from the plurality of individual memory dies on which the second distinct system-related data is stored.

21. The non-transitory computer-readable medium of claim 20, wherein the method further comprises sharing the unused die from the plurality of individual memory die between at least the first distinct system-related data and the second distinct system-related data by determining at least a first unused die from the plurality of individual memory dies on which the reserved band does not contain at least the first distinct system-related data in response to determining that the first lifetime information is greater than the threshold value at a first time and determining at least a second unused die from the plurality of individual memory dies on which the reserved band does not contain at least the second distinct system-related data in response to determining that the second lifetime information is greater than the threshold value at a second time.

* * * * *